(No Model.)
A. J. YARLOT.
DRILL FOR WELL BORING.
No. 360,838. Patented Apr. 5, 1887.
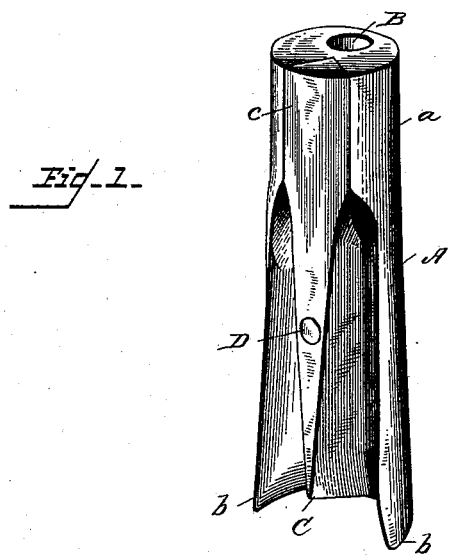
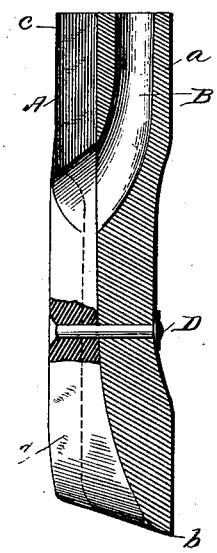
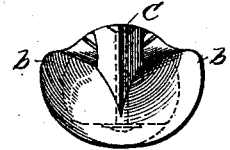

UNITED STATES PATENT OFFICE.

AARON J. YARLOT, OF NEY, ASSIGNOR OF ONE-HALF TO JOHN H. DOLL, OF WASHINGTON TOWNSHIP, DEFIANCE COUNTY, OHIO.

DRILL FOR WELL-BORING.

SPECIFICATION forming part of Letters Patent No. 360,838, dated April 5, 1887.

Application filed September 8, 1886. Serial No. 213,017. (No model.)

*To all whom it may concern:*

Be it known that I, AARON J. YARLOT, a citizen of the United States, residing at Ney, in the county of Defiance and State of Ohio, have invented certain new and useful Improvements in Drills for Well-Boring and other Purposes; and I do hereby declare the following to be a full, clear, and exact description of the invention, such as will enable others skilled in the art to which it appertains to make and use the same.

My invention relates to drills for boring wells and similar purposes, and has for its object to produce a drill which will prevent sticking or binding of the drill in the bore, which will throw the borings inwardly toward the opening provided for the passage of the borings upwardly, through the shank of the drill, to provide a center bit for boring or cutting the central portion of the bore, which bit shall be removable, in order that it may be easily sharpened, and, generally, to improve the construction and operation of the bit; and to such ends the invention consists in the construction and the combination of parts, hereinafter particularly described and claimed, reference being had to the accompanying drawings, forming a part hereof, and in which—

Figure 1 is a side view of the drill; Fig. 2, a vertical section through the same, and Fig. 3 a bottom plan view.

In the drawings, the letter A designates the drill, which has a circumferential shank, $a$, and a point, $b$, enlarged in diameter, so that the shank to which the coupling is affixed will be within the circle described by the point, in order that the upper portion of the bit may be free from close contact with the wall of the bore.

The drill, preferably, gradually enlarges from the shank or thereabout to the point, as illustrated, and is curved or rounded on its back and made concave on the opposite side or face, the walls or sides of the concave inclining inwardly toward the center of the drill, as shown. The shank has an opening or orifice, B, extending vertically through it, preferably at an inclination, as shown, and also preferably enlarged at its base, as shown, which orifice is for the passage of the drillings or borings, and is controlled, as usual in this class of drills, by a valve of the usual form employed, but not illustrated, as there is nothing new therein.

I provide the drill with a central bit, C, the shank $c$ of which is curved on its outside to conform to the curve of the shank of the drill and fits into a recess formed in the shank of the drill, the walls of said recess and corresponding faces of the bit's shank being preferably beveled or wedge-shaped, as shown in Fig. 1. The sides of the bit below the shank taper downwardly, and the lower edge of the bit can be made slanting or square across, as preferred or desired.

The center bit is held to the drill by a rivet, D, which is driven out when the bit is to be sharpened, so that when thus removed both the bit and drill can be easily sharpened.

The ordinary coupling, (not shown,) which fits over the drill-shank as in other constructions, assists in holding the center bit to its place and guards against the loss of the bit in the well-bore.

The back of the drill may be somewhat flattened or depressed, as shown in Fig. 2, so as, among other things, to reduce friction; but that portion may be round, as already described, and like the sides, as illustrated in Fig. 1.

By constructing the drill as described, the borings or drillings are forced or drawn from the back and sides of the drill to the front or concave portion thereof, and then upwardly to and through the orifice B, so that the space between the drill and well-bore above the point of the drill is kept to a great extent clear or free from the drillings or borings, and as a consequence sticking or binding of the drill avoided.

The results, as compared with other constructions heretofore used, as demonstrated by actual test of this improved drill, are greatly superior to what have heretofore been attained, and the advantages assigned to the drill have been found to exist.

Having described my invention and set forth its merits, what I claim is—

1. The drill enlarged at its lower portion and formed with a concave face on one side, a center bit tapering toward its lower end and extending down the concave face, and an orifice in the shank of the drill, communicating on opposite sides of the bit with the concave face, substantially as described.

2. The drill formed with a concave face and an orifice in the shank for the passage of drillings or borings and having secured thereto a removable center bit extending down the concave face, and provided with a shank lying in a recess formed in the shank of the drill, the shank of the bit forming a portion of the exterior of the shank of the drill, substantially as described.

In testimony whereof I affix my signature in presence of two witnesses.

AARON J. YARLOT.

Witnesses:
 JACOB YOUSE,
 JOHN M. CALKINS.